June 29, 1954  N. J. ROSENBURGH  2,682,194
OPTICAL SYSTEM FOR PHOTOGRAPHICALLY RECORDING DOCUMENTS
Filed March 29, 1951
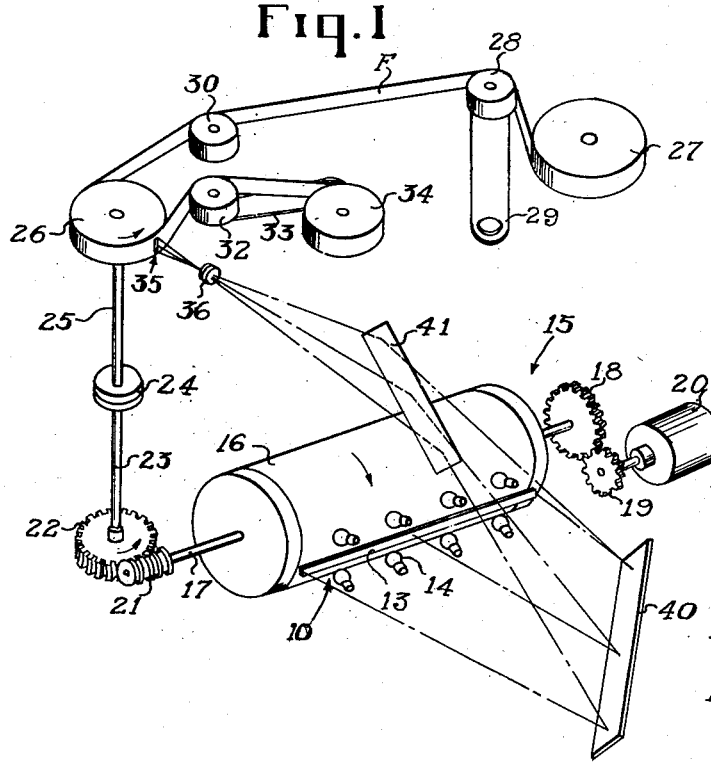
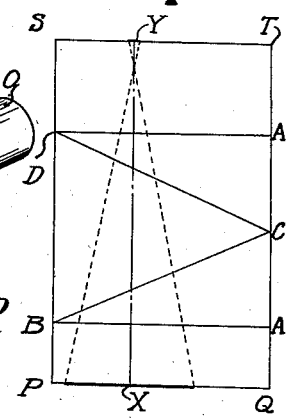
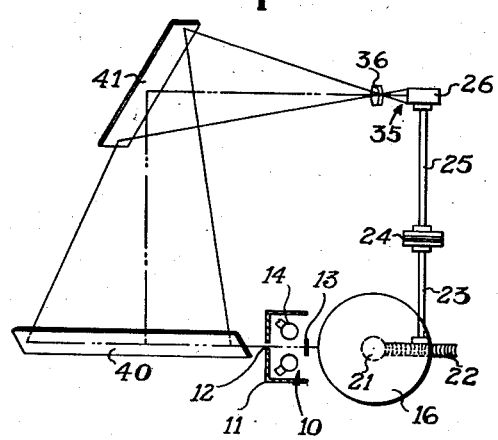
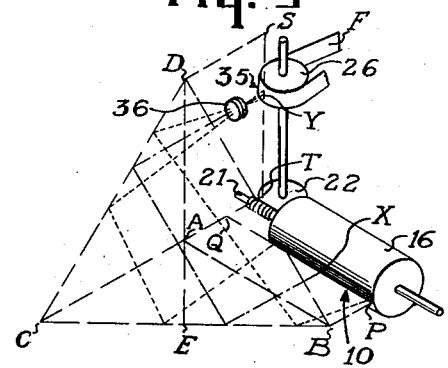
NORMAN J. ROSENBURGH
INVENTOR
ATTORNEY = AGENT Patented June 29, 1954

2,682,194

UNITED STATES PATENT OFFICE 2,682,194

OPTICAL SYSTEM FOR PHOTOGRAPHI-
CALLY RECORDING DOCUMENTS

Norman J. Rosenburgh, Rochester, N. Y., assignor
to Eastman Kodak Company, Rochester, N. Y.,
a corporation of New Jersey Application March 29, 1951, Serial No. 218,215

3 Claims. (Cl. 88—24)

This invention relates to photography and more particularly to an optical system for photographically copying or recording documents in which the optical path is folded from a horizontal plane to a vertical plane which is beyond the photographing station of the apparatus.

In many instances when the number of documents to be recorded in any one station, or in any one department, is not sufficient to warrant the installation of a copying machine at each station, it was found that a readily portable copying machine would be desirable. Such a machine, however, would have to be comparable to the well-known commercially available document copying machines in that it would have to be capable of handling the same documents, of producing substantially the same reduction of the document on the film, of operating at a similar speed, and in addition be of such size as to be readily transportable and occupy a minimum amount of space.

This has been accomplished in the present invention by folding the normal optical plane so that the optical distance is measured in a plurality of planes. It has been found, however, that the optical planes must be arranged in a particular manner to provide an operable structure which will satisfy the conditions necessitated by the location of the film strip with respect to the document. In the present invention, the film strip is moved through a plane which is perpendicular to the plane of the document when at the photographing station and the exposure station is located beyond one end of the photographing station. If the optical plane of the exposure station is perpendicular to the optical plane of the photographing station and the distance from the optical axis in either plane to the intersection of the planes is equal, then the optical path is folded through 90 degrees and is measured in three planes rather than one, thereby shortening the overall length of the apparatus by a large factor.

The primary object of the invention, therefore, is to provide an optical system for photographically copying apparatus in which the optical path is folded from a horizontal plane to a vertical plane to provide a more compact arrangement as compared to the conventional direct optical systems.

Another object of the invention is to provide an optical system for photographically copying documents in which the film strip is parallel to said document plane at said exposure station, the plane of film movement being in a plane substantially perpendicular to the plane of the document at the photographing station, and in which a reflecting system folds the optical path through an angle of 90 degrees.

Yet another object of the invention is to provide an optical system for photographically copying documents in which the optical plane of the photographing station is perpendicular to the optical plane of the exposure station and the optical axes of said stations are equidistant from the intersection of said planes.

Still another object of the invention is to provide an optical system for photographically copying documents in which the optical axes of the photographing and exposure stations lie in planes which are perpendicular to each other and the reflected document image is directed by a reflecting system from the optical plane of the photographing station into the optical plane of the exposure station.

A further object of the invention is to provide an optical system for photographically copying documents in which the reflected document images are directed by a pair of mirrors from the optical plane of the photographing station into the optical plane of the exposure station, the optical planes being perpendicular to each other and the mirrors being disposed at equal angles to their respective stations and at equal angles to their respective planes.

And another object of the invention is to provide an optical system for photographically copying documents in which the axis of the film drive roll is perpendicular to the axis of the photographing drum.

Other objects and advantages will be apparent to those skilled in the art by the description which follows.

The objects of the invention are embodied in a photographic copying apparatus having a photographing station which includes an optical plane and an optical axis in said plane, a feeding means for continuously moving a document through said photographing station, an exposure station including a lens system positioned above and beyond one end of said photographing station and an optical axis in said plane, said optical axes being equidistant from the intersection of said optical planes, a film drive roll adapted to move a film strip through said exposure station, the plane of film movement being parallel to and above the optical plane of said photographing station, an advancing means operatively connected to said feeding means for rotating said film drive roll to move said film strip at said exposure station in a plane parallel to said document plane and in a direction perpendicular to the direction of document movement to effectively advance the film strip in a direction opposed to that of the document, a mirror angularly disposed with respect to said photographing station and the optical plane thereof for receiving the reflected images of successive transverse areas of the document and directing said images out of said optical plane, and a second mirror angularly disposed with respect to said exposure station and the optical plane thereof for receiving said images from said first-mentioned mirror and directing said images into said exposure station, said mirrors being arranged at equal angles to their respective stations and at equal angles to their respective optical planes.

The word "folded," as used in the following description of the invention and in the appended claims, is to be read as meaning to change or redirect the optical path from its extension in a single plane into another plane or planes without changing the optical length of the path.

Reference is now to the accompanying drawing wherein like reference numerals designate like parts and wherein:

Fig. 1 is a diagrammatic perspective view showing the relation of optical elements to the photographing and exposure stations and the drive means for the document drum and the film strip;

Fig. 2 is a diagrammatic side elevation showing the spaced relationship of the exposure station with respect to the photographing station;

Fig. 3 is a diagrammatic perspective view showing the relation of the various planes in which the film is moved, in which the document is moved, and in which the images are reflected into the exposure station; and Fig. 4 is a developed view of the optical plane and showing the lines about which this single plane is folded to provide the arrangement of planes shown in Fig. 3.

Similar to other document recording apparatus, the apparatus disclosed includes a photographing station, a feeding means for moving documents through the photographing station, an exposure station, an advancing means for moving a film strip through the exposure station in synchronism with the movement of the document, and an electromagnetic clutch which connects the advancing means to the feeding means upon actuation of control members in the document path as shown and described in U. S. Patent No. 2,403,711 issued July 9, 1946, to J. F. Egan.

The photographing station 10 comprises a plate 11 provided with a slit aperture 12, a glass flat 13 which is positioned to permit the documents to be moved thereunder, and lamps 14 which provide illumination for the document.

The feeding means 15 for the documents comprises a drum 16 which is secured to shaft 17, said shaft being continuously rotated by means of gears 18 and 19 which are driven by motor 20. The documents are fed onto drum 16 and are moved by said drum beneath glass flat 13 and past aperture 12 where the successive transverse areas of the document are illuminated by lamps 14. Shaft 17 has fixed thereto a worm 21 which meshes with worm wheel 22 secured to vertical shaft 23. An electromagnetic clutch 24 couples shaft 23 to shaft 25 on which the film drive roll 26 is mounted. The film strip F has a path extending from supply reel 27 around tension roller 28 mounted on the spring-biased arm 29, around idler roller 30, around film drive roll 26, around tension roller 32 mounted on spring-biased arm 33 and to the take-up reel 34. The feeding means, therefore, may be considered to include drum 16 and the motor 20 which continuously rotates said drum. The advancing means for moving the film strip in synchronism with the movement of the document comprises film drive roll 26, clutch 24, and the worm gear drive 21, 22 which connects the drum or feeding means to shaft 23.

In the preferred embodiment of the invention, the film drive roll 26 is disclosed as being driven through clutch 24 by means of the worm wheel 22 and worm 21 on shaft 17 of drum 16. While such a drive displaces the axis of rotation of film drive roll 26 to one side or the other of the axis of rotation of drum 16, the axes are, nevertheless, perpendicular to each other. Since film drive roll 26 must be driven in synchronism with the movement of drum 16, the reduction of the optical system determines the ratio of movement between the respective shafts. In instances where the reduction is small, it is feasible to utilize a bevel gear drive between film drive roll 26 and drum 16, in which case the axes of rotation will be perpendicular to each other in the same plane. In the present disclosure where the reduction is large, it is more feasible to utilize a worm gear drive to obtain the proper ratio, in which case the axes are perpendicular to each other but not necessarily in the same plane. Therefore, when reference is made to the perpendicular relation of the axes of rotation of the film drive roll and drum, such perpendicularity is meant to include both perpendicular in the same plane and perpendicular but with the axes displaced.

The exposure station 35 is considered as the focal plane of the projection lens system 36. The film F is moved through station 35 by film drive roll 26 whose periphery is substantially tangent to the focal plane.

To more clearly understand the relation of the various elements and the relation of the various elements to the different planes in which these elements are located and arranged, it is believed that said planes should be defined with respect to each other. The document plane, as is well-known in the art where the document is scanned in successive transverse areas, is perpendicular to the optical plane. In other words, even though in some instances the document may be curved about the conveying drum, the increment being photographed at any instant is so small that for all practical purposes it may be considered as being straight and perpendicular to the optical plane. Since the optical plane is folded through 90 degrees, that portion of the optical plane containing the exposure station and which is referred to as the exposure plane is perpendicular to the optical plane and perpendicular to the document plane. The film plane, therefore, must be parallel to the document plane at the exposure station in order that the latent images of increments of the document will be properly oriented thereon. The plane of film movement, or the plane in which the supply reel, take-up reel and film drive roll are positioned so that the film strip will be moved through the exposure station parallel to the document plane, is perpendicular to the document plane and the direction of film movement is perpendicular to the direction of the document movement.

The optical means for directing the reflected images of successive transverse areas of the document into exposure station 35 comprises mirror 40, mirror 41 and lens system 36. In a straight line photographic system, as shown in Fig. 4, a line of the document extending axially of drum 16 as represented by line PQ is imaged in the focal plane of lens system 36 as represented by line ST. Such a system to obtain sufficient reduction to image a document on 16 mm. film requires an optical path of considerable length. Also, such a system requires that the camera be positioned beyond the reach of the operator and in order to load or unload the camera, the operator must leave the position occupied when feeding documents into the apparatus.

In the present invention, the normal optical plane PQST has been folded along lines BC and CD so that the optical plane CDST of the exposure station is perpendicular to the optical plane PBCQ of the photographing station. This folding of the optical plane PQST is such that the exposure station 35 is positioned above and beyond the end of the photographing station 10, as shown in Figs. 2 and 3. Accordingly, the film F is moved in a plane which is perpendicular to the plane of the document at photographing station 10, or in a plane parallel to optical plane PBCQ. While the document is wrapped partially around drum 16 as it is moved through the photographing station, the width of the aperture 12 is such that the successive portions of the document being photographed may be considered as being substantially parallel to plate 11 or tangent to the periphery of drum 16, hence, the plane of film movement is perpendicular to the plane of document movement at photographing station 10 and the axis of rotation of film drive roll 26 is perpendicular to the axis of rotation of drum 16 and lies in the optical plane of the exposure station.

To satisfy these conditions, therefore, the portion of the optical axis XY which lies in plane PBCQ and the portion of the optical axis XY which lies in plane CDST must be equidistant from the intersection of their respective planes. With respect to Figs. 3 and 4, $$AB = AD \text{ and } AC = \frac{BD}{2}$$

then in Fig. 4, since $$AB = AD$$

$$BD = AB\sqrt{2}$$

$$AC = AB\frac{\sqrt{2}}{2}$$

$$\angle ABC = \angle ADC$$

$$\tan \angle ABC = \frac{AC}{AB} = \frac{\sqrt{2}}{2}$$

therefore $\angle ABC = 35° \ 15' \ 52''$

By drawing AE perpendicular to BC, then $$AE = AB \sin \angle ABC$$
$$= AB \sin 35° \ 15' \ 52''$$
$$AE = 0.577 AB$$

$$\tan \angle AED = \frac{AD}{AE} = \frac{AB}{AE} = \frac{1}{.577}$$

therefore $\angle AED = 60°$

Consequently, mirror 40 is disposed at an angle of 35° 15' 22" to the photographing station 10 and at an angle of 60° to the optical plane of the photographing station. In a like manner, it can be shown that mirror 41 is disposed at the same angle with respect to the exposure station and at the same angle to the optical plane of said exposure station. This arrangement provides the most compact arrangement of the optical system and also permits the use of a direct and positive drive between drum shaft 17 and shafts 23 and 25 and does not necessitate inclining or tilting the axis of rotation of film drive roll 26. Since the mirrors 40 and 41 direct the reflected document images into the projection lens system 36, or exposure station 35, the images are rotated by said mirrors through an angle of 90 degrees. In other words, with the folding of the optical plane from a horizontal to a vertical plane by mirrors 40 and 41, the reflected image is rotated through a similar angle.

To briefly describe the operation of the apparatus, the document is fed manually, or by means of an automatic feeder, onto the continuously rotating drum 16. As the document is moved toward photographing station 10, a control number, not shown, positioned in the document path is actuated by the leading edge of the document to energize lamps 14 and clutch 24 after a predetermined interval. Upon energization of clutch 24 the film F is moved past exposure station 35 in synchronism with the movement of the document by means of film drive roll 26. The transverse areas of the document which are visible through aperture 12 are illuminated by lamps 14 and the reflected document image is directed by mirror 40 into mirror 41 which, in turn, directs the image into lens system 36 for projecting the image onto film F. From Fig. 1, it will be noted that the horizontal aperture 12 is imaged on the film F as a vertical aperture, or in other words, the mirrors 40 and 41 have rotated the image through an angle of 90 degrees. As the trailing edge of the document leaves the control member, the lamps and clutch are deenergized after a predetermined interval. The manner in which the lag is obtained before the clutch and lamps are rendered operative or inoperative is fully disclosed in the above-mentioned Egan patent.

Since other variations of the invention are possible and will be readily recognized by those skilled in the art, the present disclosure is illustrative of a preferred embodiment and the scope of the invention is defined by the appended claims.

Having now particularly described my invention, what I desire to secure by Letters Patent of the United States and what I claim is:

1. In photographic copying apparatus having a photographing station including an optical plane and an optical axis in said plane, the combination with a feeding means for continuously moving a document through said photographing station, of an exposure station positioned above and beyond one end of said photographing station in a plane displaced from and parallel to the plane of said photographing station and having an optical plane substantially perpendicular to said first-mentioned optical plane and including a lens system having an optical axis in the optical plane of said exposure station, the distance between said first-mentioned optical axis and the optical plane of said exposure station being equal to the distance between the optical axis of said lens system and the optical plane of said photographing station, a film advancing means operatively connected to said document feeding means including a drive roll having its axis of rotation in the optical plane of said exposure station and for moving the film strip in a plane parallel to said document plane at said exposure station and in synchronism with the movement of said document, and a reflecting system including a mirror angularly disposed with respect to said photographing station and the optical plane thereof for receiving the reflected document images and directing said images out of said plane and a second mirror angularly disposed with respect to said exposure station and the optical plane thereof for receiving the reflected images from said first-mentioned mirror and directing said images into said lens system, said mirrors being arranged at equal acute angles less than 45° to their respective stations and at equal acute angles greater than 45° to their respective optical planes.

2. In photographic copying apparatus having a photographing station including an optical plane and an optical axis in said plane, the combination with a rotatable drum for moving a document through said photographing station and perpendicular to said optical plane, and a drive means operatively connected to said drum for continuously rotating the same, of an exposure station positioned above and beyond one end of said photographing station in a plane displaced from and parallel to the plane of said photographing station, said exposure station having an optical plane substantially perpendicular to said first-mentioned optical plane and including a lens system having an optical axis in the optical plane of said exposure station, a drive roll arranged above and beyond one end of said photographing station and having an axis of rotation perpendicular to the axis of rotation of said drum for moving a film strip through the focal plane of said lens system in a plane parallel to said document plane, the plane of film movement being perpendicular to said document plane, a second drive means operatively connected to the shaft of said drum for rotating said drive roll in synchronism with the movement of the document through said photographing station, a mirror disposed at an angle with respect to said photographing station and at an angle with respect to the optical plane of said photographing station for receiving the reflected images of successive transverse areas of the document and directing said images out of said optical plane, and a second mirror disposed at an angle with respect to said exposure station and at an angle with respect to the optical plane of said exposure station for receiving the reflected images from said first-mentioned mirror and directing said images into said lens system, said mirrors being disposed at equal acute angles less than 45° to their respective stations and at equal acute angles greater than 45° to their respective optical planes.

3. In photographing copying apparatus having a photographing station including an optical plane and an optical axis in said plane, the combination with a rotatable drum for moving a document through said photographing station and perpendicular to said optical plane, drive means operatively connected to said drum for continuously rotating the same, of an exposure station arranged in a plane parallel to said photographing station having an optical plane substantially perpendicular to said first-mentioned optical plane and including a lens system having an optical axis in the optical plane of said exposure station, a drive roll arranged above and beyond one end of said photographing station and having an axis of rotation perpendicular to the axis of rotation of said drum for moving a film strip through the focal plane of said lens system in a plane parallel to said document plane, the plane of film movement being perpendicular to said document plane, a second drive means operatively connected to the shaft of said drum for rotating said drive roll in synchronism with the movement of the document through said photographing station, a mirror disposed at an angle with respect to said photographing station and at an angle with respect to the optical plane of said photographing station for receiving the reflected images of successive transverse areas of the document and directing said images out of said optical plane, and a second mirror disposed at an angle with respect to the optical plane of said exposure station for receiving the reflected images from said first-mentioned mirror and directing said images into said lens system, said mirrors being arranged at equal acute angles of substantially 35° 16' to their respective stations and at equal acute angles of substantially 60° to their respective optical planes.

References Cited in the file of this patent

UNITED STATES PATENTS

| Number | Name | Date |
|--------|------|------|
| 1,802,530 | Pilny | Apr. 28, 1931 |
| 2,234,717 | Altman | Mar. 11, 1941 |
| 2,298,422 | Sandvik | Oct. 13, 1942 |
| 2,411,694 | Place | Nov. 26, 1946 |